Figure 1:
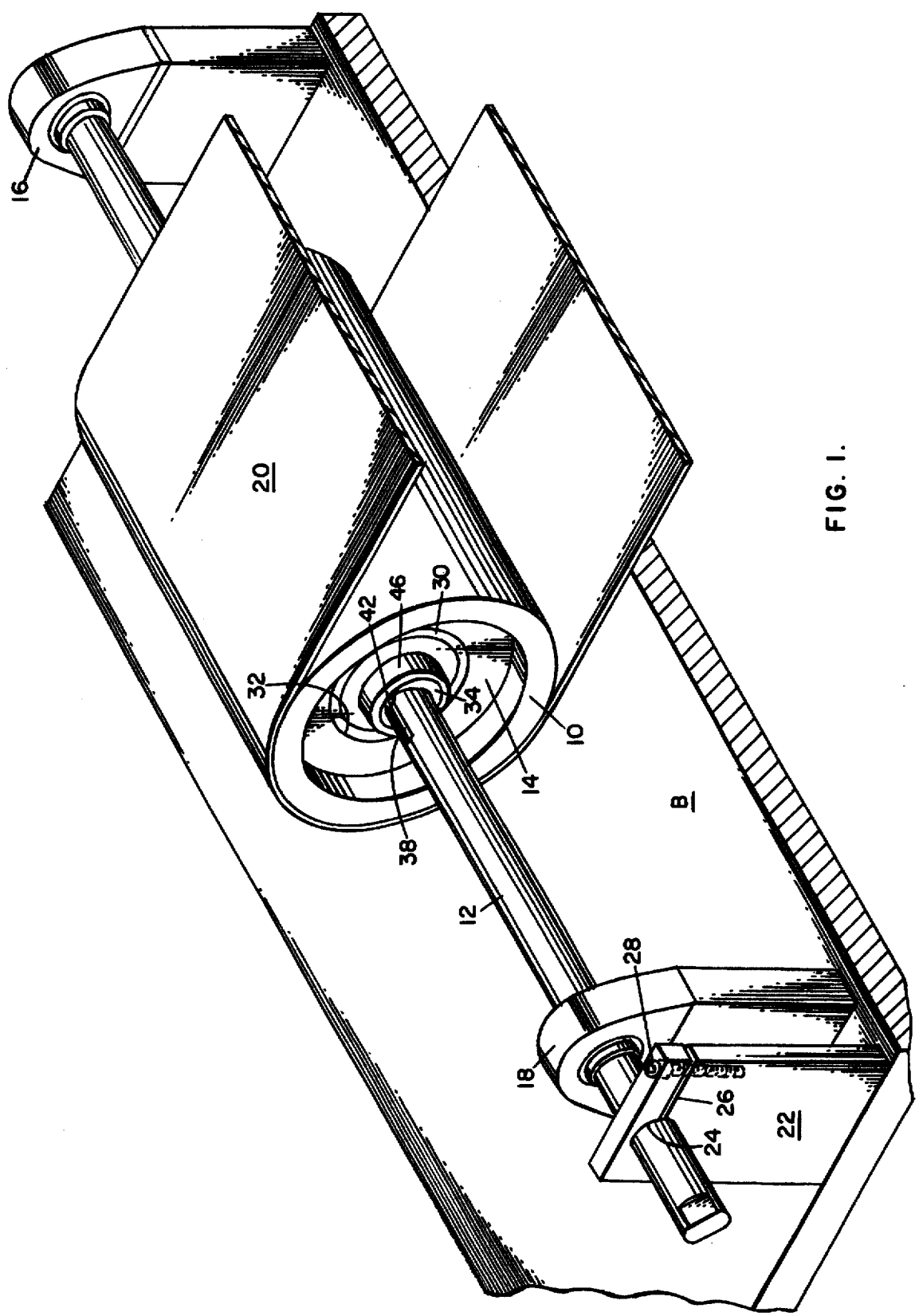

United States Patent [19]

Valcourt et al.

[11] Patent Number: 5,676,613
[45] Date of Patent: Oct. 14, 1997

[54] INDEPENDENTLY STEERABLE TUBE STOCK IDLER PULLEY

[75] Inventors: Robert F. Valcourt, Southwick; Sean M. Philbin, East Longmeadow, both of Mass.

[73] Assignee: Belt Technologies, Inc., Agawam, Mass.

[21] Appl. No.: 760,426

[22] Filed: Dec. 4, 1996

[51] Int. Cl.$^6$ ............................................. F16H 7/22
[52] U.S. Cl. ........................ 474/102; 474/112; 474/123
[58] Field of Search .............................. 474/101, 102, 474/112, 123

[56] References Cited

U.S. PATENT DOCUMENTS

| | | | |
|---|---|---|---|
| 891,636 | 6/1908 | Sandera | 474/112 X |
| 2,245,925 | 6/1941 | Klaucke | 474/112 X |
| 2,368,362 | 1/1945 | Johnstone | 474/112 |
| 2,691,553 | 10/1954 | Pettigrew | 474/112 X |
| 3,399,582 | 9/1968 | Henry | 474/112 X |
| 3,416,384 | 12/1968 | Maca | 474/112 |
| 3,543,597 | 12/1970 | De Schamphelagre et al. | 474/103 |
| 4,015,484 | 4/1977 | Taylor | 474/187 X |
| 5,117,969 | 6/1992 | Roth | 474/104 X |
| 5,427,581 | 6/1995 | McGrath et al. | 474/101 |
| 5,518,457 | 5/1996 | Seki et al. | 474/102 |

*Primary Examiner*—Roger J. Schoeppel
*Attorney, Agent, or Firm*—Ross, Ross & Flavin

[57] ABSTRACT

An independently steerable tube stock idler pulley for simplifying tracking adjustments of a belt, wherein the pulley is rotatably mounted on a fixed shaft supported at its ends by such as pillow blocks or the like, with a pair of roller bearings for permitting rotational movement of the pulley relative to the shaft and a pair of steering bushings each mounted within a bearing and keyed to the shaft, the steering bushings each having a bore which is offset and non-concentric relative to the outer diameter of the bushing, one bushing being rotated 180° out of phase relative to the other bushing for inducing an angle into the pulley relative to the axis of rotation and locking mechanism for selectively locking the shaft against rotation, with the angle of the pulley being alterable by loosening the locking mechanism and rotating the shaft following which the locking mechanism is secured.

8 Claims, 3 Drawing Sheets

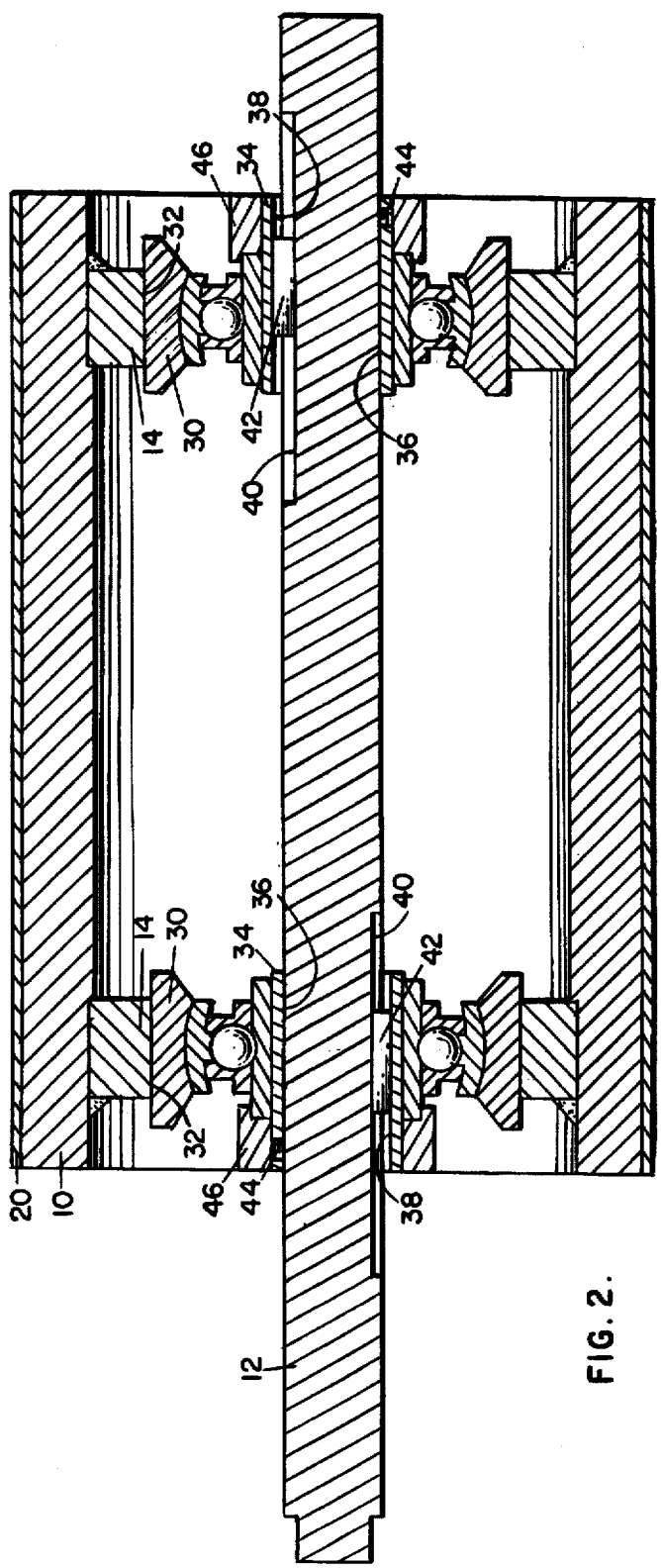
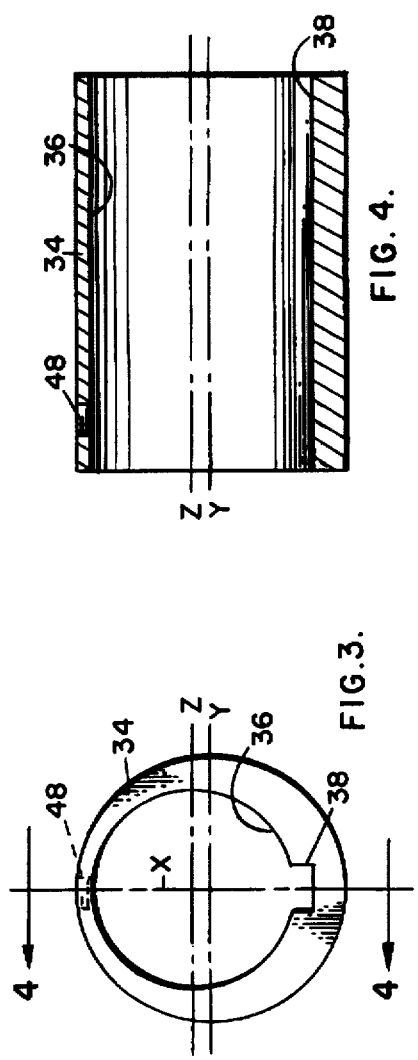
FIG. 2.
FIG. 3.
FIG. 4.

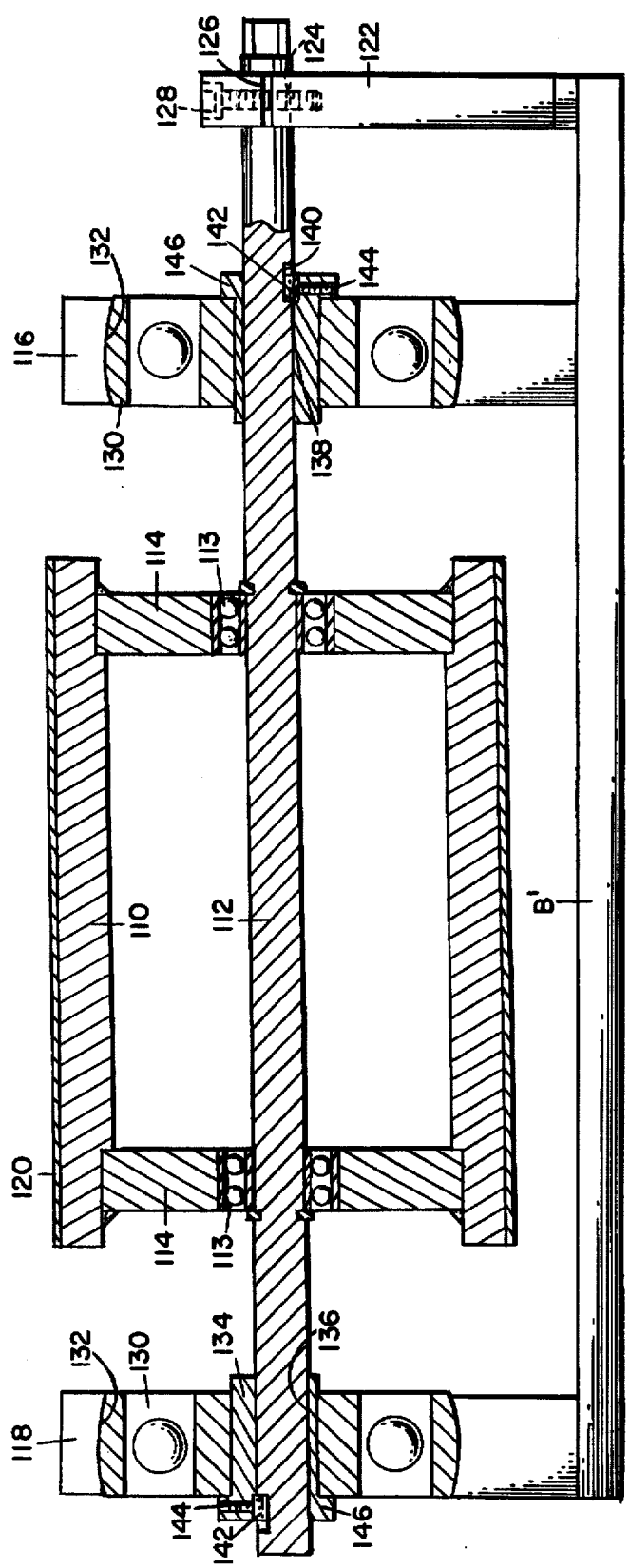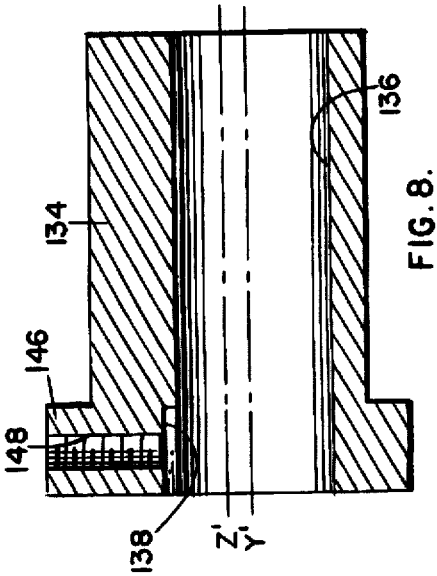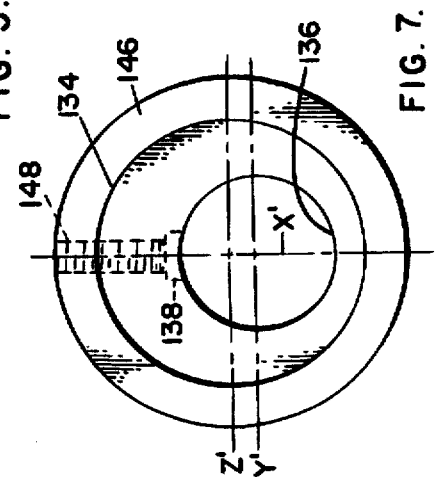

INDEPENDENTLY STEERABLE TUBE STOCK IDLER PULLEY

BACKGROUND OF THE INVENTION

1. Field of the Invention

The invention relates generally to pulley systems and more particularly to tracking adjustments of wide belt systems.

2. Description of the Prior Art

In prior U.S. Pat. No. 5,427,581, an independently steerable idler pulley is operable by means of a non-concentric or skew angle adjustable inner sleeve bushing mounted interiorly of a radial ball bearing fitted within the inner diameter of the pulley, with the sleeve bushing and bearing and pulley press fitted as an assembly for mounting on an idler shaft.

The bushing bore is fabricated at a skew angle with respect to its outer diameter. The skew angle allows a constantly changing eccentricity of the bushing bore relative to the bore outer diameter.

As the bushing is rotated about its axis, the skew angle is translated to the pulley, all leading to a desired pivotal motion to track a belt entrained about the pulley.

However, the structure as described therein would not be appropriate for use with a wide tubular pulley as used in a wide belt system.

SUMMARY OF THE INVENTION

The independently steerable tube stock idler pulley of the invention was conceived to simplify the tracking adjustments of wide belt type systems.

The independently steerable idler pulley hereof also allows tracking adjustments to be made with the system in operation, which is not feasible in traditional wide/belt/pulley arrangements.

The structure of the invention consists of:

a wide, tubular idler pulley on which a wide belt travels, the pulley being rotatably mounted on a fixed shaft supported at its ends by such as pillow blocks or the like;

a pair of roller bearings for permitting rotational movement of the pulley relative to the shaft;

a pair of steering bushings each mounted within a bearing and keyed to the shaft, the steering bushings each having a bore which is offset and non-concentric relative to the outer diameter of the bushing;

one bushing being rotated 180° out of phase relative to the other bushing; and locking means for selectively locking the shaft against rotation.

In one embodiment, the roller bearings and steering bushings are mounted within each end cap of the pulley, with the shaft extending through the pulley and being selectively lockable against rotation by locking means spaced from the pulley.

In another embodiment, the roller bearings and steering bushings are mounted exteriorly of the pulley in the pillow blocks which support the shaft, the shaft being selectively lockable against rotation by locking means spaced from one of the pillow blocks.

The principle of operation in either embodiment involves mounting each of two steering bushings to a dead shaft with a key, the bore of each bushing being non-concentric or offset relative to its outer diameter.

Each bushing is rotated 180° out of phase relative to the other and captured by the inner race of a radial bearing to prevent lateral motion along the shaft. This mounting approach induces an angle into the pulley relative to the axis of rotation because the bushings are out of phase. To alter this angle, the shaft locking means is loosened and the dead shaft is rotated. This ability to alter the angle provides the means to track the belt from side-to-side along the shaft axis. Once the desired tracking characteristics are achieved, the shaft locking means is secured.

BRIEF DESCRIPTION OF THE DRAWINGS

FIG. 1 is a perspective view of a tube stock idler pulley and wide belt embodying a preferred form of the invention mounted upon a dead shaft;

FIG. 2 is an enlarged, fragmentary cross-sectional view taken through the tube stock idler pulley and wide belt of FIG. 1 with parts omitted, with the bore offset exaggerated to better illustrate the essence of the invention;

FIG. 3 is an end elevational view of one of the steering bushings of the tube stock idler pulley of FIG. 2;

FIG. 4 is a cross sectional view of the steering bushing of FIG. 3 taken on line 4—4 of FIG. 3;

FIG. 5 is a cross-sectional view taken through a tube stock idler pulley and wide belt embodying a modified form of the invention, with the bore offset exaggerated to better illustrate the essence of the invention;

FIG. 6 is an end elevational view of one of the steering bushings of the tube stock idler pulley of FIG. 5 as seen from the left thereof;

FIG. 7 is an opposite end elevational view of the steering bushing of FIG. 6; and FIG. 8 is a cross sectional view of the steering bushing of FIG. 6 taken on line 8—8 of FIG. 6.

DESCRIPTION OF THE PREFERRED EMBODIMENT

FIGS. 1–4 of the drawings illustrate a preferred embodiment of the invention wherein a wide, tubular idler pulley 10 is mounted on a dead shaft 12 which extends through and outwardly of fixed end caps 14 provided at opposite ends of the pulley.

Shaft 12 is supported at its opposite ends by pillow block assemblies 16 and 18 fixed to a base B.

Pulley 10 supports a belt 20 entrained therearound and entrained at its opposite end around a drive pulley, not shown.

One free end of shaft 12 is releasably and lockingly supported by a locking means 22 fixed to base B adjacent pillow block assembly 18.

Locking means 22 has a central bore 24 adapted to embrace the outer periphery of shaft 12 and is horizontally split at its forward face to provide a gap 26 which extends inwardly into the locking means and communicates with central bore 24.

A downwardly extending bolt 28 threaded in the locking means bridges gap 26 and, upon appropriate rotation in one direction is adapted to close the gap to bring the locking means into tightly embracing relation to the outer periphery of shaft 12 to preclude rotation of the shaft.

Rotation of bolt 28 in an opposite direction is adapted to open gap 26 permitting the rotation of shaft 12, all for purposes to appear.

A roller bearing 30 is press fit in a provided central opening 32 in each end cap 14.

Each roller bearing 30 sleeves a steering bushing 34 which sleeves shaft 12. Each steering bushing has a bore 36 with a horizontal center line Y which is offset or non-concentric relative to a horizontal center line Z of the outer diameter of the steering bushing, as shown in FIGS. 3 and 4.

The offset of bore 36 is exaggerated in the drawings to better illustrate the essence of the invention. In practice, the offset will only be a few thousands of an inch.

A keyway or slot 38 extends from bore 36 into the body of each steering bushing on a central vertical axis X and extends longitudinally for the length of the steering bushing.

Keyway or slot 38 in each steering bushing 34 faces a longitudinally-extending keyway or slot 40 provided in the outer periphery of shaft 12.

A key 42 disposed in keyway 38 of each steering bushing 34 extends into each keyway 40 of shaft 12.

A set screw 44 and a collar 46 provided on each steering bushing 34 secure the steering bushings to shaft 12.

Set screws 44 extend vertically through provided threaded openings 48 in each steering bushing with their inner ends contacting shaft Collars 46 are sleeved on steering bushings 34 and contact bearings 30.

Keyways 40 are spaced along shaft 12 and are 180° out of phase with respect to each other, whereby steering bushings 34 and their respective keyways 38 and keys 42 are also 180° out of phase with respect to each other.

This mounting approach induces an angle into pulley 10 relative to the axis of rotation because steering bushings 34 are out of phase. To alter this angle, shaft locking means 22 is loosened and dead shaft 12 is rotated. This ability to alter the angle provides the means to track belt 20 from side-to-side along the shaft axis. Once the desired tracking characteristics are achieved, shaft locking means 22 is secured.

In the preferred form of the invention of FIGS. 1–4, steering bushings 34 are mounted in the body of pulley 10.

In the modified form of the invention illustrated in FIGS. 5–8, the steering bushings are mounted outside the body of the pulley.

Referring now to FIGS. 5–8, a wide, tubular idler pulley 110 is mounted on a dead shaft 112 which extends through and outwardly of roller bearings 113 press fit in fixed end caps 114 provided at opposite ends of the pulley.

Shaft 112 is supported at its opposite ends by pillow block assemblies 116 and 118 fixed to a base B'.

Pulley 110 supports a belt 120 entrained therearound and entrained at its opposite end around a drive pulley, not shown.

One free end of shaft 112 extends through and is releasably and lockingly supported by a locking means 122 fixed to base B' adjacent pillow block assembly 116.

Locking means 122 has a central bore 124 adapted to embrace the outer periphery of shaft 112 and is horizontally split at its forward face to provide a gap 126 which extends inwardly into the locking means and communicates with central bore 124.

A downwardly extending bolt 128 threaded in the locking means bridges gap 126 and, upon appropriate rotation in one direction is adapted to close the gap to bring the locking means into tightly embracing relation to the outer periphery of shaft 112 to preclude rotation of the shaft.

Rotation of bolt 128 in an opposite direction is adapted to open gap 126 permitting the rotation of shaft 112, all for purposes to appear.

A roller bearing 130 is press fit in a provided central opening 132 in each pillow block assembly 116 and 118.

Each roller bearing 130 sleeves a steering bushing 134 which sleeves shaft 112. Each steering bushing has a bore 136 with a horizontal center line Y' which is offset or non-concentric relative to a horizontal center line Z' of the outer diameter of the steering bushing, as shown in FIGS. 6–8.

The offset of bore 136 is exaggerated in the drawings to better illustrate the essence of the invention. In practice, the offset will only be a few thousands of an inch.

A keyway or slot 138 extends from bore 136 into the body of each steering bushing on a central vertical axis X' and extends longitudinally for a portion of the length of the steering bushing.

Keyway or slot 138 in each steering bushing 134 faces a longitudinally-extending keyway or slot 140 provided in the outer periphery of shaft 112.

A key 142 disposed in keyway 138 of each steering bushing 134 extends into each keyway 140 of shaft 112.

A set screw 144 and a collar 146 provided on each steering bushing 134 secure the steering bushings to shaft 112.

Set screws 144 extend vertically through provided threaded openings 148 in each-steering bushing with their inner ends contacting shaft 112.

Collars 146 are formed integrally with steering bushings 134 and contact bearings 130.

Keyways 140 are spaced along shaft 112 and are 180° out of phase with respect to each other, whereby steering bushings 134 and their respective keyways 138 and keys 142 are also 180° out of phase with respect to each other.

This mounting approach induces an angle into pulley 110 relative to the axis of rotation because steering bushings 134 are out of phase. To alter this angle, shaft locking means 122 is loosened and dead shaft 112 is rotated. This ability to alter the angle provides the means to track belt 120 from side-to-side along the shaft axis. Once the desired tracking characteristics are achieved, shaft locking means 122 is secured.

In either the embodiment of FIGS. 1–4 or the embodiment of FIGS. 5–8, the principle of operation is the same and involves mounting each of two steering bushings to a dead shaft with a key, the bore of each bushing being non-concentric or offset relative to its outer diameter, with each bushing being rotated 180° out of phase relative to the other and captured by the inner race of a radial bearing to prevent lateral motion along the shaft.

We claim:

1. An independently steerable idler pulley for accommodating a wide belt comprising in combination:
    a tubular pulley over which the belt travels;
    a fixed shaft on which the pulley is rotatably mounted;
    a pair of spaced steering bushings each mounted on and keyed to the shaft adjacent each end of the pulley, the steering bushings each having a bore which is offset and non-concentric relative to the
    outer diameter of the bushing;
    one steering bushing being rotated 180° out of phase relative to the other steering bushing for inducing an angle to the pulley relative to its axis of rotation; and
    locking means for selectively locking the shaft against rotation.

2. An independently steerable idler pulley according to claim 1 wherein the steering bushings are sleeved by bearings.

3. An independently steerable idler pulley according to claim 1 wherein the steering bushings are mounted interiorly of the pulley.

4. An independently steerable idler pulley according to claim 1 wherein the steering bushings are mounted exteriorly of the pulley.

5. An independently steerable idler pulley according to claim 1, wherein the shaft is supported at its ends by pillow blocks.

6. An independently steerable idler pulley for accommodating a wide belt comprising in combination:
   a tubular pulley over which the belt travels;
   a fixed shaft on which the pulley is rotatably mounted;
   means supporting the ends of the shaft;
   a pair of spaced steering bushings each mounted on and keyed to the shaft adjacent each end of the pulley, the steering bushings each having a bore which is offset and non-concentric relative to the outer diameter of the bushing;
   a bearing disposed between the pulley and each steering bushing for allowing rotational motion between the pulley and steering bushing;
   one steering bushing being rotated 180° out of phase relative to the other bushing for inducing an angle to the pulley relative to its axis of rotation; and
   locking means for selectively locking the shaft against rotation.

7. An independently steerable idler pulley according to claim 6, wherein the steering bushings and bearing-are integral with the pulley.

8. An independently steerable idler pulley according to claim 6, wherein the steering bushings and bearings are integral with the means supporting the ends of the shaft.

* * * * *